May 13, 1941. R. A. WOLF 2,242,159
STOWABLE CONTROL COLUMN
Filed July 7, 1938 2 Sheets-Sheet 1
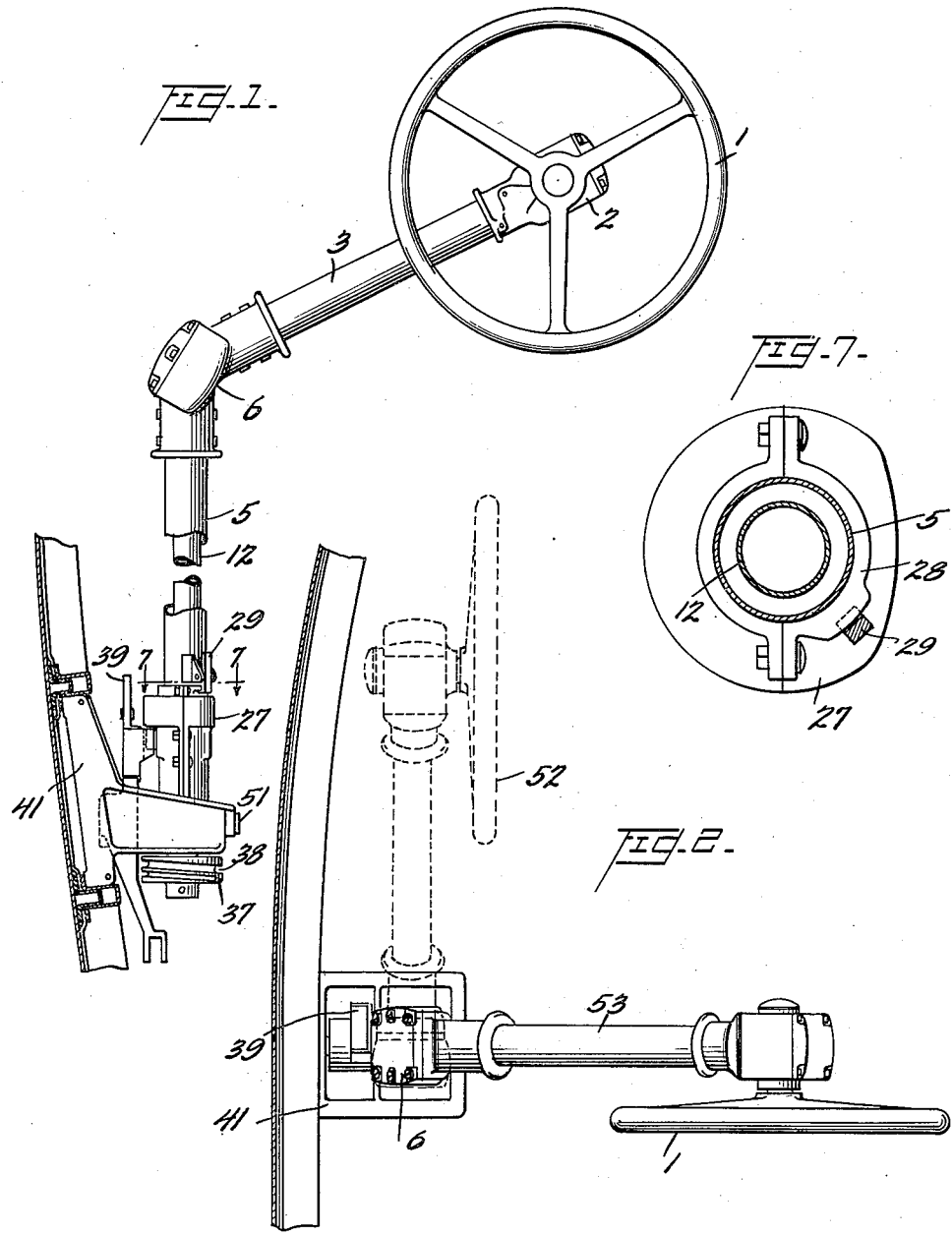
Inventor
Robert A. Wolf,
Semmes, Keegin & Semmes May 13, 1941.  R. A. WOLF  2,242,159
STOWABLE CONTROL COLUMN
Filed July 7, 1938  2 Sheets-Sheet 2
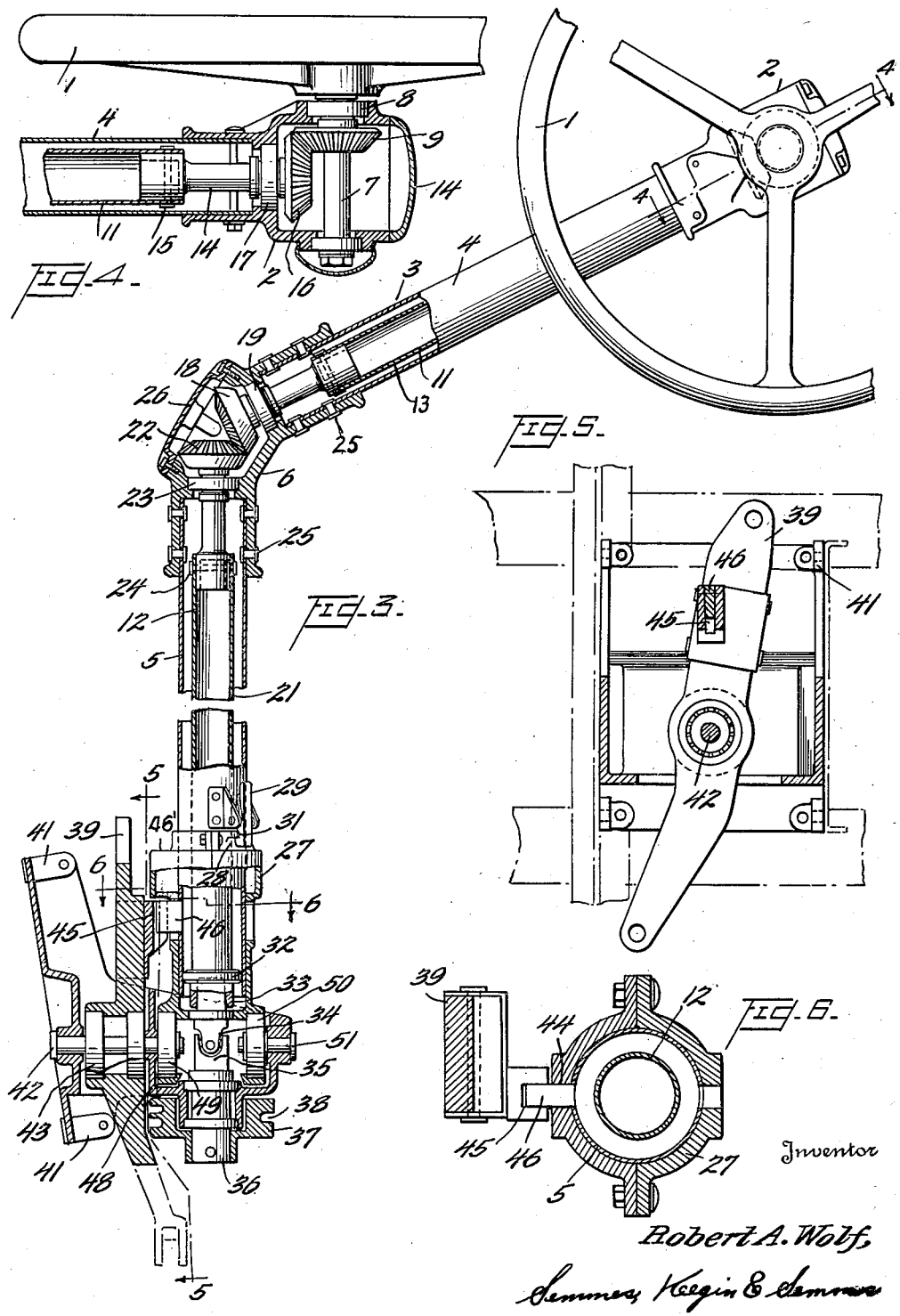

Patented May 13, 1941

2,242,159

UNITED STATES PATENT OFFICE 2,242,159

STOWABLE CONTROL COLUMN

Robert A. Wolf, Kenmore, N. Y., assignor to Bell Aircraft Corporation, Buffalo, N. Y., a corporation of New York Application July 7, 1938, Serial No. 217,999

2 Claims. (Cl. 244—83)

This invention relates to a device for controlling the operating surfaces of an airplane, and more particularly to a control column, with linkages to two control surfaces of an airplane, which may be folded out of the way when not in use and still provide rigid, compact, readily accessible control when desired.

One of the objects of this invention is to provide a control column, to activate the control surfaces of an airplane, which is so constructed that it may be folded away when not in use.

Another object of my invention is to provide a dual control for an airplane which consists of a pair of control columns, each of which is provided with linkages to two control surfaces, and either or both of which may be folded against the side of the fuselage of the airplane when not in use and still provide rigid, compact, readily accessible control when desired.

With these and other objects in view, this invention embraces the concept of providing a dual control for an airplane which consists of a pair of columns positioned at opposite sides of the fuselage. Each of these columns provides a means of primary control of the airplane, and the linkages of either of them may be detached from connection with the control surfaces of the airplane and the column turned on its axis to a position against the side of the fuselage, thus allowing for movement of personnel and equipment in the space which it formerly occupied. Moreover, when the airplane is not in flight, both of these control columns may be turned against the fuselage in this manner.

In this connection, it should be noted that, although the column may be readily engaged and disengaged from the control system at a moment's notice, it provides positive and rigid control when in operative position combined with light weight, compactness and accessibility.

In the drawings:

Figure 1 is a side elevational view of the control column, the center section of which is partly broken away.

Figure 2 is a plan view of my control column in operative position, the dotted lines showing the control column in folded position.

Figure 3 is a vertical, longitudinal section partly in elevation.

Figure 4 is a view taken along line 4—4 of Figure 3, looking in the direction of the arrows.

Figure 5 is a view taken along line 5—5 of Figure 3, looking in the direction of the arrows.

Figure 6 is a view taken along line 6—6 of Figure 3, looking in the direction of the arrows.

Figure 7 is a view taken along line 7—7 of Figure 1, looking in the direction of the arrows.

As best shown in Figure 3, one of the control columns which form the basis of this invention consists of a wheel 1 which is mounted on a gear box 2. The gear box 2 is supported by the upper extremity of an elbow column, generally designated by the numeral 3.

This elbow column 3 consists of an upper tube member 4 and a lower tube member 5, which are joined by an elbow-shaped gear housing 6 to form the elbow column 3.

As best shown in Figure 4, the wheel 1 is carried by a shaft 7, which is mounted by means of suitable bearings 8 in the gear box 2. Rigidly mounted on the shaft 7 is a beveled gear 9.

Contained within the upper tube section 4 and the lower tube section 5 are torque shafts 11 and 12, respectively. The upper torque shaft 11 preferably consists of a hollow tube 13, although, if desired, a solid rod may be used, one extremity of which carries a beveled gear shaft 14 to which it is secured by riveting or other suitable means, as shown at 15. Formed integrally with this shaft 14 is a beveled gear 16, which is mounted in the gear box 2 by bearings or other suitable means, such as shown at 17, and meshes with the beveled gear 9.

The lower end of this torque shaft 11 carries a similar beveled gear 18, which is mounted in the elbow-shaped gear housing 6 by bearings of any suitable design, such as shown at 19.

The lower torque shaft 12 also consists of a hollow tube 21 upon the upper extremity of which is mounted a beveled gear 22, which is contained within the gear box 6 and meshes with the beveled gear 18. The shaft of this beveled gear 22 is mounted in the gear box 6 by means of suitable bearings 23 and is attached to the tube 21 by any suitable means, such as the rivet shown at 24.

The elbow-shaped gear box 6 is attached to the outer tubes 4 and 5 by rivets or other suitable means, such as shown at 25, and it is provided with a movable plate 26 which may be removed to inspect the beveled gears 18 and 22, respectively.

The lower end of the lower tube section 5 is mounted in a support and retaining socket 27 which is provided with an adjustable collar 28, which encircles the lower portion of the tube member 5. Mounted on the outer surface of the lower tube section 5 is a latch 29 which is designed to engage a stop 31, which is provided on the adjustable collar 28.

The lower extremity of the torque shaft 12 is provided with a bearing 32 which fits snugly the inner surface of the tube section 5, and this shaft 12 terminates in a tapered socket 33 which operatively engages a key 34 which together with the stub shaft 35 forms the universal joint 36. A pulley 37 is rigidly mounted on the stub shaft 35. This pulley 37 is grooved, as shown at 38, and is connected by wires or other suitable means to the ailerons of the airplane.

As best shown in Figure 5, a crank 39, the arms of which are linked to and control the elevators of the airplane, is mounted on the fuselage structure, which is indicated at 41, by means of a shaft 42. The shaft 42 is provided with a pair of bearings 43 upon which the crank 39 is adapted to rotate. Both the retaining socket 27 and one arm of the crank 39 are provided with slots, indicated at 44 and 45 respectively, and a key 46 formed integrally with the torque shaft 5 is slidably mounted in the slots 44 and 45, its upward movement being limited by a shelf 46' built into the socket 27. As best shown in Figure 6, the crank 39 and the elbow column 3 may be linked together by placing the slots 44 and 45 in opposed relationship and inserting the key 46 in the slot 44.

The shaft 42 is mounted in the gear box 48 and carries on its inner extremity a bearing 49 which is situated within the box. A bearing 50 mounted on a stub shaft 51 is also provided within the gear box 48 and the retaining socket 27 is mounted on these bearings 49 and 50. The crank 39 is adapted to be linked to a primary control surface of the airplane.

In operation, the universal 36 and therefore the pulley 37 may be given a rotative movement in either direction by rotating the wheel 1. The rotative movement of the wheel 1 is imparted to the pulley 37 through the bevel gears 9 and 16 which impart a rotative movement to the torque shaft 11 which acts upon the torque shaft 12 through the bevel gears 18 and 22, respectively. This motion of the torque tube 12 is transmitted by means of the universal joint 36 to the pulley 37.

A fore and aft motion may be given to the crank 39 by pulling or pushing the wheel 1. This pushing or pulling force causes the retaining socket 27 to rotate upon the bearings 49 and 50, and this movement is transmitted to the crank 39 through the key 46. The connection between the pulley 37 and the wheel 1 is not broken by this fore and aft movement of the control column 3 because of the slippage allowed by the slot 35 in the universal joint 36.

From the above description it is believed obvious that an effective rotary motion upon the pulley 37 may be produced by rotating the wheel 1, and a fore and aft motion may be imparted to the crank 39 by either pushing or pulling the wheel 1 in a direction away from or towards the operator.

When it is no longer desired to use the control column, it may be readily placed in inoperative position against the side of the fuselage. In order to place the column in inoperative position, the latch 29 is released and the column 3 is pulled upwardly from the retaining socket 27 until the tapered socket 33 and the key 46 disengage the universal joint 36 and slot 45 in the crank 39, respectively.

The retaining socket 27 is so designed that the shelf 46' will limit the movement of the key 46. After the key 46 comes to rest against the shelf 46', the column is rotated upon its axis into its stored position and the crank 39 and the pulley 37 which are integral with the primary control system may now be operated independently of the stowed column.

To place the control column in operation, it is merely rotated back into a position where the tapered socket 33 and the key 46 will engage the socket 35 of the universal joint 36 and the socket 45 of the crank 39. The lock 29 is now placed in operative position and holds the column in this position until stowed again.

From the above description it is believed obvious that I have provided a control column for an airplane which may be stored against the side of the fuselage when not in use, as shown at 52 in Figure 2, and, when in operative position, as shown at 53 in the same figure, is so constructed as to be able to control two primary control surfaces of the airplane. Moreover, the airplane may be provided with a dual control by the use of two or more of these control columns, and one or more of these control columns may be in use or stored simultaneously as conditions require. While for purposes of illustration I have shown one manner by which these control columns may be constructed, it is obvious that various mechanical changes may be made in this construction without departing from the spirit of this invention. I, therefore, wish it to be understood that I am to be limited only by the prior art and the scope of the appended claims.

I claim:

1. A control device adapted to be mounted in the fuselage of an airplane to operate the elevator and aileron control surfaces of the airplane comprising a column, a rotative means contained within the column, a base for the column, pivotal means attached to the fuselage upon which the base is mounted in such a manner that the free end of the column is movable in a fore and aft direction in respect to the fuselage, a device attached to the elevator control surfaces, said device being pivotally mounted on the said pivotal means, means to detachably connect said device to said control column, a device attached to the aileron control surfaces of the airplane, means to detachably connect said device to said rotative means, and means for releasing said column from said base whereby the column may be raised a sufficient distance to disconnect the column and rotative means from the said devices connected to the control surfaces of the airplane thereby permitting the column to be rotated about its own axis on the said base.

2. A control device adapted to be mounted in the fuselage of an airplane to operate the elevator and aileron control surfaces of the airplane comprising a column, a vertically extending torque means within the column, a base for the column, a device attached to the elevator control surfaces, a shaft attached to the wall of the fuselage and vertically disposed in relation thereto, said base and device being pivotally mounted on said shaft, means for detachably connecting the said device to the said column, a stub shaft mounted on the base, a device connected to the aileron control surfaces rigidly mounted on said stub shaft, means connecting said stub shaft to the torque shaft in such a manner that the connection will be disengaged by raising the column and torque shaft, and means for releasing said column from said base whereby the column may be raised to disconnect the column and torque shaft from the said devices connected with the control surfaces, and means whereby the column may be pivoted on its own axis.

ROBERT A. WOLF.